(12) United States Patent
Zimmer et al.

(10) Patent No.: US 10,132,670 B2
(45) Date of Patent: Nov. 20, 2018

(54) ARRANGEMENT FOR LEVEL MEASUREMENT

(71) Applicant: MARQUARDT MECHATRONIK GMBH, Rietheim-Weilheim (DE)

(72) Inventors: Andreas Zimmer, Dunningen (DE); Tobias Jauch, Lauterbach (DE)

(73) Assignee: Marquardt Mechatronik GmbH, Rietheim-Weilheim (DE)

( * ) Notice: Subject to any disclaimer, the term of this patent is extended or adjusted under 35 U.S.C. 154(b) by 65 days.

(21) Appl. No.: 14/255,232

(22) Filed: Apr. 17, 2014

(65) Prior Publication Data
US 2014/0331990 A1    Nov. 13, 2014

(30) Foreign Application Priority Data
Apr. 24, 2013   (DE) .................. 10 2013 007 020

(51) Int. Cl.
| | | |
|---|---|---|
| *G01F 23/16* | (2006.01) | |
| *G01F 23/14* | (2006.01) | |
| *F28D 20/00* | (2006.01) | |

(52) U.S. Cl.
CPC ......... *G01F 23/14* (2013.01); *F28D 20/0034* (2013.01); *F28D 2020/0078* (2013.01); *Y02E 60/142* (2013.01)

(58) Field of Classification Search
CPC .................................................. G01F 23/164
See application file for complete search history.

(56) References Cited

U.S. PATENT DOCUMENTS

| | | | | |
|---|---|---|---|---|
| 2,036,582 | A * | 4/1936 | Kollsman | ............ G01F 23/164 251/57 |
| 2,578,276 | A * | 12/1951 | Yarnall | ............... G01F 23/0007 200/81.5 |
| 2,860,652 | A * | 11/1958 | Badger, Jr. | ............... G05D 9/00 137/98 |
| 4,120,289 | A * | 10/1978 | Bottum | ................ F24D 11/003 126/586 |

(Continued)

FOREIGN PATENT DOCUMENTS

| | | |
|---|---|---|
| CN | 1346435 A | 4/2002 |
| DE | 535 195 A | 10/1931 |

(Continued)

OTHER PUBLICATIONS

German Search Report (Application No. 10 2013 007 020.1) dated Nov. 4, 2013.

(Continued)

*Primary Examiner* — Lisa Caputo
*Assistant Examiner* — Alex Devito
(74) *Attorney, Agent, or Firm* — Burr & Brown, PLLC

(57) ABSTRACT

The invention relates to a measuring device for measuring a level of a fluid in a container for holding a fluid, specifically a level sensor. The container is provided with a conduit for at least one of the supply and the removal of the fluid. A dynamic pressure probe, such as a pitot tube, is arranged in the conduit. The dynamic pressure probe is connected to a pressure sensor for measuring the pressure in the dynamic pressure probe. The fluid level in the container can be determined by using the measured pressure.

17 Claims, 8 Drawing Sheets

(56) References Cited

U.S. PATENT DOCUMENTS

| | | | | |
|---|---|---|---|---|
| 4,487,074 A | * | 12/1984 | Herden | G01L 9/007 338/41 |
| 4,987,783 A | | 1/1991 | D'Antonio et al. | |
| 6,357,229 B1 | * | 3/2002 | Schust | F16D 33/16 60/357 |
| 6,363,779 B1 | * | 4/2002 | Hochenberger | G01L 19/0007 73/114.37 |

FOREIGN PATENT DOCUMENTS

| | | |
|---|---|---|
| DE | 1 965 433 U | 8/1967 |
| DE | 10 2008 008 338 A1 | 8/2009 |
| GB | 1 287 927 A | 9/1972 |
| WO | 00/50851 A1 | 8/2000 |

OTHER PUBLICATIONS

Chinese Office Action and Search Report (Application No. 201410246616.7) dated May 3, 2018 (with English translation).

* cited by examiner

ARRANGEMENT FOR LEVEL MEASUREMENT

CROSS-REFERENCE TO RELATED APPLICATION

This application claims the benefit under 35 USC § 119(a)-(d) of German Application No. 10 2013 007 020.1 filed Apr. 24, 2013.

BACKGROUND OF THE INVENTION

1. Field of the Invention

The present invention relates to a measuring device.

2. Description of Related Art

Such a measuring device is used for level measurement in a container. In particular, this measuring device is a level sensor.

On a container for holding a fluid, for example, water, it is known to provide a measuring device for measuring the level for the fluid in the container. The container, configured in the manner of a tank, is provided with a conduit, comprising a pipe, for example, for the supply and/or removal of the fluid. For simplicity, the filling and/or emptying of the container can take place via the only one conduit, which is attached to the underside of the container. Here, the attachment of the measuring device to the container is complicated.

SUMMARY OF THE INVENTION

The present invention is based on the object of simplifying the arrangement of the measuring device on the container. In particular, the level is to be measured via the only one conduit. In particular, a level measurement is to be implemented via the pressure on any desired liquid tank. In particular, it is to be possible to measure the level continuously during the filling and/or emptying.

In the measuring device according to the present invention, a dynamic pressure probe, which, in particular, is configured in the manner of a pitot tube, is arranged in the conduit. The dynamic pressure probe is connected to a pressure sensor for measuring the pressure in the dynamic pressure probe. As a result, the level in the container can be determined by using the measured pressure. To be specific, the measured pressure in the dynamic pressure probe, which in turn corresponds to the measured total pressure on the underside of the container, corresponds to the level of the container. Thus, the level measurement for a container is made possible by means of a dynamic pressure probe or a pitot tube.

In a further refinement, the dynamic pressure probe can be arranged in the conduit substantially at right angles to the longitudinal direction of the conduit, and therefore to the flow direction of the fluid. In a straightforward manner, at least one opening, which, in particular, can be configured in the manner of a drilled hole, is located in the dynamic pressure probe. Expediently, the dynamic pressure probe can be arranged in the conduit in such a way that the opening is directed toward the container. By means of this principle, as the container is emptied, a stagnation point is produced in front of the dynamic pressure probe, so that the measured pressure corresponds to the current level of the container. As the container is filled, separation of the flow occurs behind the dynamic pressure probe, so that the measured pressure likewise corresponds to the current level of the container. The level of the container can thus be determined and/or indicated continuously during the filling and/or emptying of the container.

In a simple and economical configuration of the present invention, the dynamic pressure probe can comprise a pipe. Expediently, the one end of the pipe can be fixed to the conduit, specifically fixed in a fluid-tight manner to the wall of the conduit. Such a fluid-tight fixing can be implemented, for example, by means of welding, soldering, adhesive bonding or the like. The other end of the pipe can be arranged such that the end penetrates the conduit. The pressure sensor can be arranged at the other end on the opening of the pipe. Preferably an arrangement is provided such that the pressure sensor is located outside of the conduit. The pressure sensor can have a housing in the usual way to protect the sensor. Furthermore, a diaphragm can be arranged in and/or on the housing for the purpose of sealing. In a functionally reliable way, a resilient element for resetting the diaphragm can be provided. In order to generate the pressure signal, a signal transmitter can be operatively connected to the diaphragm and/or the resilient element, and/or a signal receiver can interact with the signal transmitter.

In order to reduce the installed height of the pressure sensor, it may be worthwhile to configure the resilient element in the manner of a disk-like leaf spring. Expediently, the leaf spring can have a circular shape which corresponds substantially to the shape of the diaphragm. A particularly high resetting force can be achieved in the case of the resilient element by the leaf spring having a spring element extending spirally from the center to the edge region of the leaf spring. This ensures a compact configuration with a high spring force. For the purpose of simple and economical production, the resilient element can be produced from metal as a punched part.

In a simple and economical configuration of the present invention, the signal transmitter can comprise a magnet. The signal receiver can comprise a position sensor, which detects the magnetic field generated by the magnet. The position sensor can economically be a Hall sensor. It may be worthwhile simply to arrange the signal transmitter on the resilient element, specifically, in the center of the resilient element. In order to prevent any displacement between the magnet and the spring, the signal transmitter can expediently be adhesively bonded to the resilient element.

In order to protect the sensitive parts of the pressure sensor largely against damaging influences, the diaphragm and/or the resilient element, and also the signal transmitter and/or the signal receiver, can be arranged in the interior of the housing. The housing can then have a connecting piece for supplying the fluid pressure to be measured or the fluid to the diaphragm. Expediently, the connecting piece can be arranged in a fluid-tight manner on the other end of the dynamic pressure probe.

The measuring device according to the present invention is suitable, in particular, for use in a device for heating water. In particular, this device can be one such for heating water by means of solar energy. The device comprises a container to hold the water, the container being provided with a conduit for the supply of cold water and/or for the removal of warm water. The measuring device according to the present invention for measuring the water level in the container is then arranged in and/or on the conduit.

For a particularly preferred refinement of the measuring device according to the present invention, the following is to be recorded.

With a specific arrangement, by using a dynamic pressure probe or a pitot tube, the level in any desired tank can be determined. The pipe that can be filled and/or emptied is provided with a dynamic pressure probe or a pitot tube. The measured pressure in this probe corresponds to the level of the tank. The principle of the dynamic pressure probe or of the pitot tube is known per se from flow measurement. Here, the flow velocity is calculated from the total pressure (measured by a pitot tube) minus the static pressure (measured by a piezometer).

The measured total pressure on the underside of a tank corresponds to the level in the tank. Thus, the measured pressure on a pitot tube or on a dynamic pressure probe corresponds to the level in the tank. The pitot tube can be introduced at right angles to the flow direction. The drilled holes in the tube are oriented in the direction of the tank. By means of this principle, during emptying, a stagnation point is produced in front of the probe; the measured pressure here corresponds to the current level. During the filling of the tank, separation of the flow behind the probe results; the pressure measured here likewise corresponds to the current level. The level can thus be indicated continuously during the filling and/or the emptying of the tank.

The advantages achieved with the present invention consist, in particular, in the fact that by using the arrangement according to the invention, the level can be determined continuously during the filling and/or emptying of a container. Influencing factors, such as the speed of filling and/or emptying of the container, have no effect on the level measurement. Existing adaptations on the underside of the container can be used by fitting a pitot tube with a pressure sensor for level measurement, specifically irrespective of whether this is a filling and/or an emptying adaptation.

BRIEF DESCRIPTION OF THE DRAWINGS

An exemplary embodiment of the invention, together with various developments and refinements, is illustrated in the drawings and will be described in more detail below. In the drawings.

DETAILED DESCRIPTION OF THE INVENTION

Figure 1:
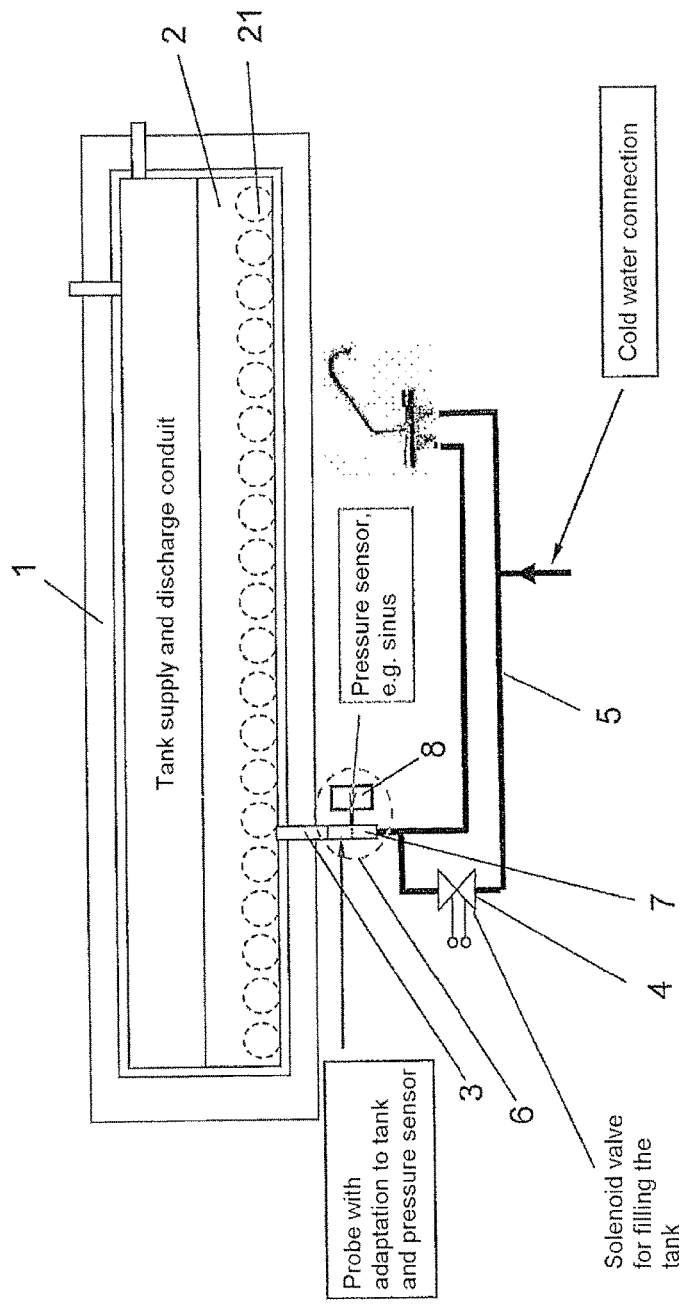
FIG. 1 shows a system for supplying a building with solar-heated water.

FIG. 1 reveals a container 1 for holding a fluid 2, specifically in the present case, the container 1 is used to hold solar-heatable water 2 (solar water heater). In order to heat the water 2, there are in the container 1 pipes 21 connected to the solar collector and arranged in the form of loops for the heat exchange medium. The container 1 is provided with a single conduit 3, comprising a pipe, for the supply and/or removal of the fluid 2. The conduit 3 is in turn connected via a controllable solenoid valve 4 to a water supply system 5 for the building. By means of appropriate activation of the solenoid valve 4, the container 1 can thus be filled with cold water 2 from the water supply system 5. The warm water 2 heated by means of solar energy and located in the container 1 can be fed in a corresponding way to the water supply system 5 in the building.

Provided on the container 1 is a measuring device, such as level sensor 6, for measuring the level of the fluid in the container 1, also designated a level sensor for short below. The level sensor 6 comprises a dynamic pressure probe 7 arranged in the conduit 3 in the manner of a pitot tube and a pressure sensor 8, which is connected to the dynamic pressure probe 7 to measure the pressure in the dynamic pressure probe 7. By using the measured pressure, the level in the container 1 can be determined as a result. Here, the measured total pressure on the underside of the container 1 corresponds to the level in the container 1. Thus, the measured pressure on the dynamic pressure probe 7 corresponds to the level in the container 1.

Figure 2:
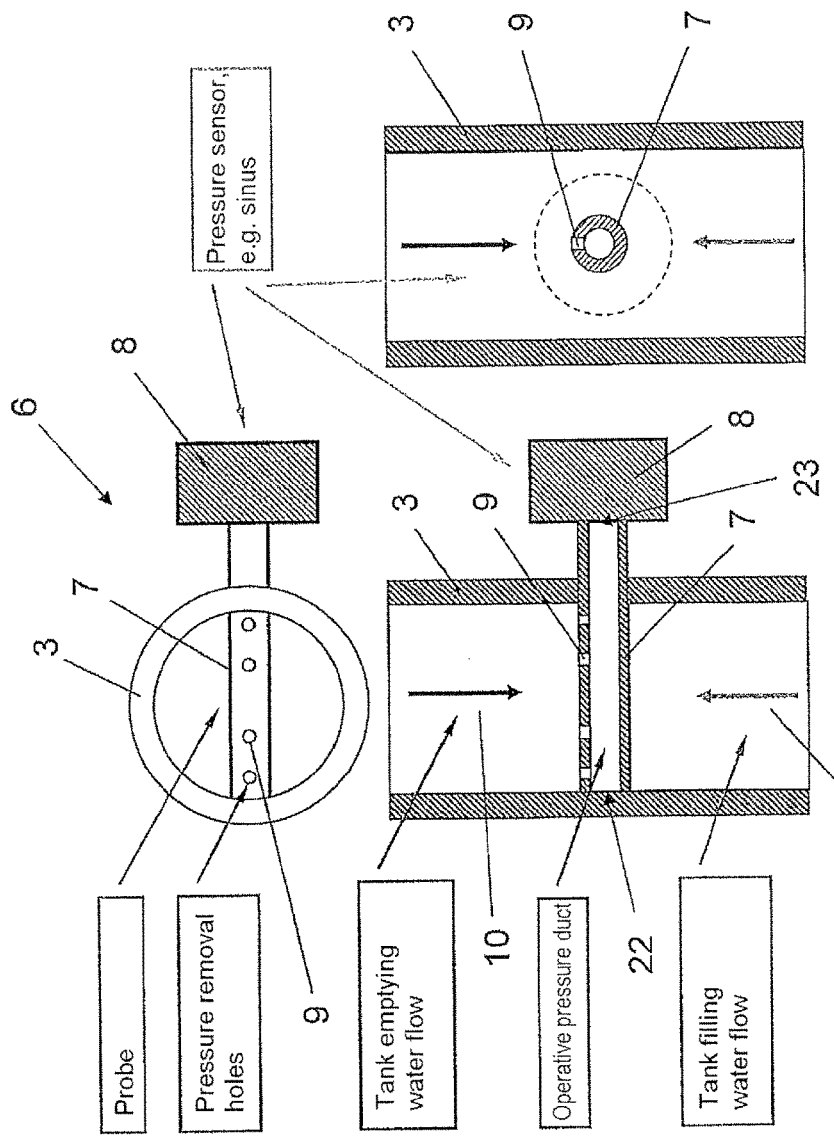
FIG. 2 shows the level sensor from FIG. 1 in an enlarged illustration.

The more detailed configuration of the level sensor 6 can be seen in FIG. 2. The dynamic pressure probe 7 is arranged substantially at right angles to the longitudinal direction of the conduit 3 and, therefore, to the flow direction of the fluid 2 in the conduit 3. The dynamic pressure probe 7 comprises a pipe in the present case. In the pipe of the dynamic pressure probe 7 there is at least one opening 9, specifically in the manner of a drilled hole. Here, the opening 9 is directed toward the container 1. The one end 22 of the pipe 7 is fixed to the conduit 3, specifically fixed in a fluid-tight manner to the wall of the conduit 3. For the purpose of fixing, it is worthwhile for the end 22 of the pipe 7 to be welded, soldered, adhesively bonded or the like to the conduit 3. The other end 23 of the pipe 7 penetrates the wall of the conduit 3 at the opposite point. The pressure sensor 8 is arranged at the other end 23 on the opening of the pipe 7, specifically outside the conduit 3.

By means of this principle, during emptying, a stagnation point is produced in front of the dynamic pressure probe 7 in accordance with the flow direction for the fluid 2. Here, the measured pressure corresponds to the current level in the container 1. During the filling of the container 1, in accordance with the flow direction 11 for the fluid 2, the result is separation of the flow behind the dynamic pressure probe 7. The measured pressure here likewise corresponds to the current level in the container 1. The level can thus be indicated continuously during the filling in accordance with flow direction 11 and/or the emptying in accordance with flow direction 10. This is further illustrated schematically in FIG. 3 and FIG. 4.

Figure 3:
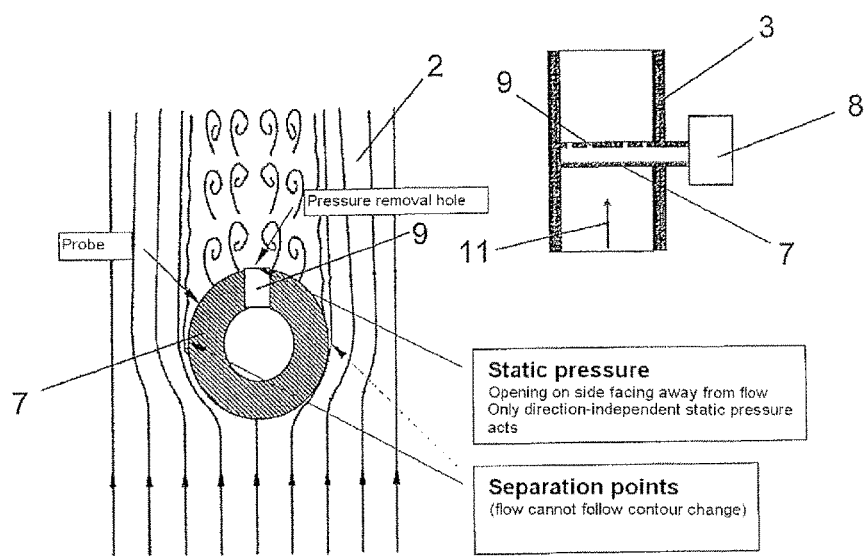
FIG. 3 shows a schematic illustration relating to the filling of the container.

The filling of the container 1 is illustrated in FIG. 3. When the container 1 is being filled, the openings (pressure removal holes) are located on the side facing away from the flow. The flow is not able to follow the contour change of the dynamic pressure probe 7 and separates from the probe contour (in relation to the separation points, see FIG. 3). As a result, the direction-independent static pressure, which represents the current level of the container 1, acts immediately behind the dynamic pressure probe 7, specifically on the pressure removal holes 9.

Figure 4:
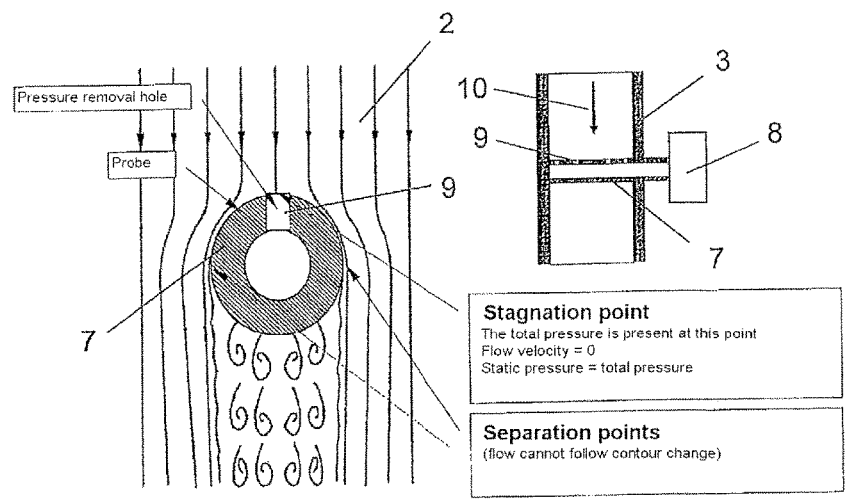
FIG. 4 shows a schematic illustration relating to the emptying of the container.

The emptying of the container 1 is illustrated in FIG. 4. Here, the dynamic pressure probe 7 is located in the uniform flow. Thus, the flow stagnates immediately in front of the dynamic pressure probe 7, which produces the so-called stagnation point (see FIG. 4). At the stagnation point, the flow is completely at rest; here, with the aid of the pressure sensor 8 it is possible to measure the total pressure, which represents the current level of the container 1.

Figure 5:
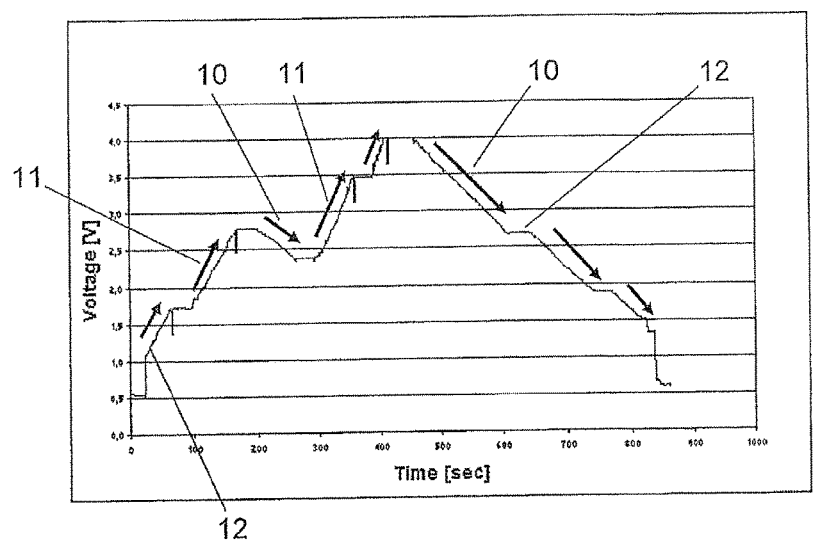
FIG. 5 shows a diagram relating to the behavior of the pressure sensor during the filling and emptying of the container.

The pressure sensor 8 generates an electric voltage, the value of which corresponds to the measured pressure. The voltage values 12 determined by means of the pressure sensor 8, which therefore correspond to the respectively measured pressure, are illustrated by way of example in FIG. 5. A continuous level measurement is made possible during the filling according to the flow direction 11 and during the emptying according to the flow direction 10.

Figure 6:
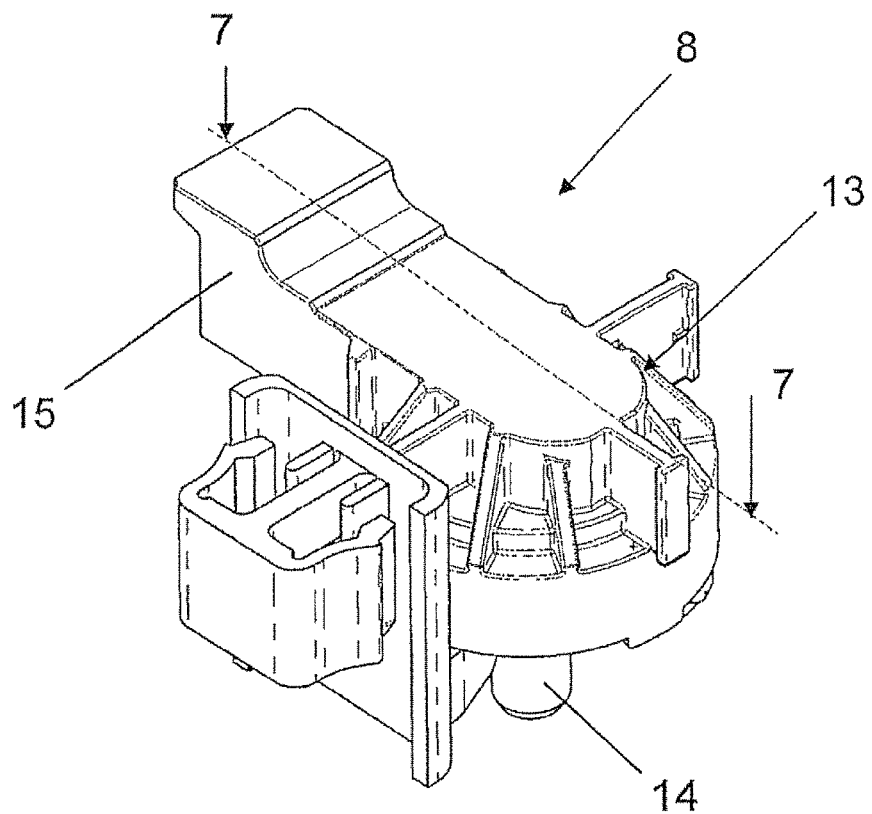
FIG. 6 shows the pressure sensor from FIG. 1 in an enlarged illustration.

The more detailed configuration of the pressure sensor is shown in FIG. 6. The pressure sensor 8 has a housing 13. The housing 13 has a connecting piece 14 for supplying the fluid pressure to the pressure sensor 8. For this purpose, the connecting piece 14 is arranged in a fluid-tight manner on the other end 23 of the dynamic pressure probe 7. The pressure measured by means of the pressure sensor 8 is output as a voltage value 12 at the electric connection 15 located on the housing 13.

Figure 7:
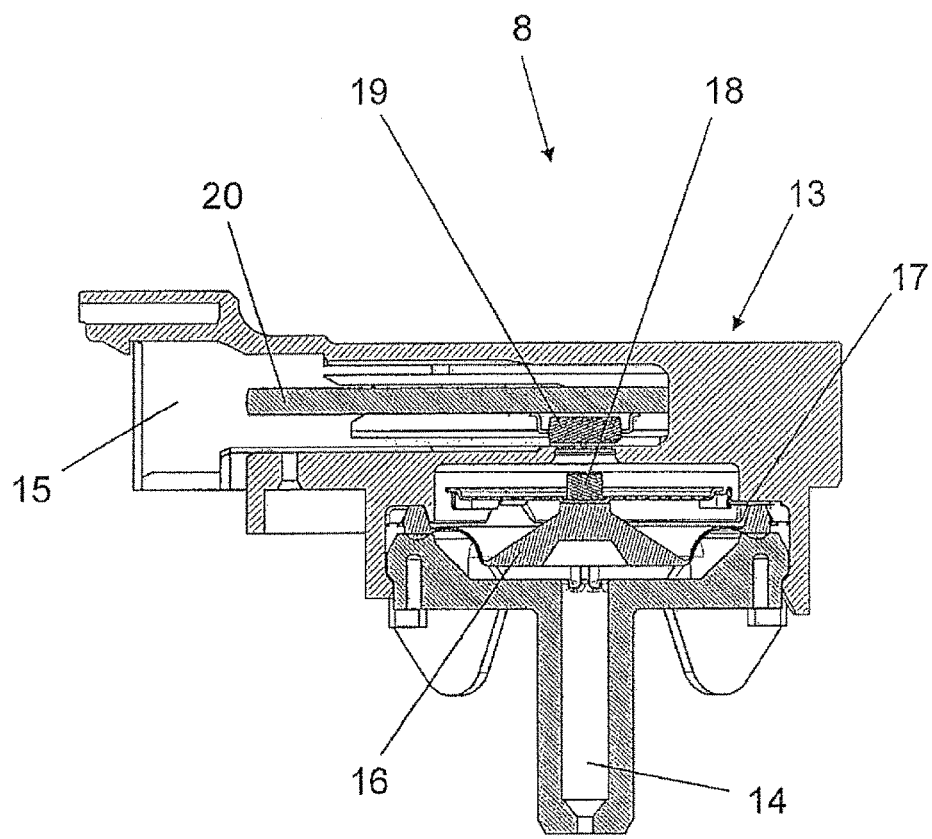
FIG. 7 shows a section along the line 7-7 in FIG. 6.

As can be seen further by using FIG. 7, a diaphragm 16 is arranged in and/or on the housing 13. Furthermore, a resilient element 17 for resetting the diaphragm 16 is provided. A signal transmitter 18 is operatively connected to the diaphragm 16 and/or the resilient element 17. Finally, a signal receiver 19 further interacts with the signal transmitter 18. In the present case, the signal transmitter 18 comprises a magnet and the signal receiver 19 comprises a position sensor detecting the magnetic field generated by the magnet 18. To be specific, the position sensor 19 in particular comprises a Hall sensor. The signal receiver 19 is arranged on a printed circuit board 20 located in the housing 13.

Figure 8:
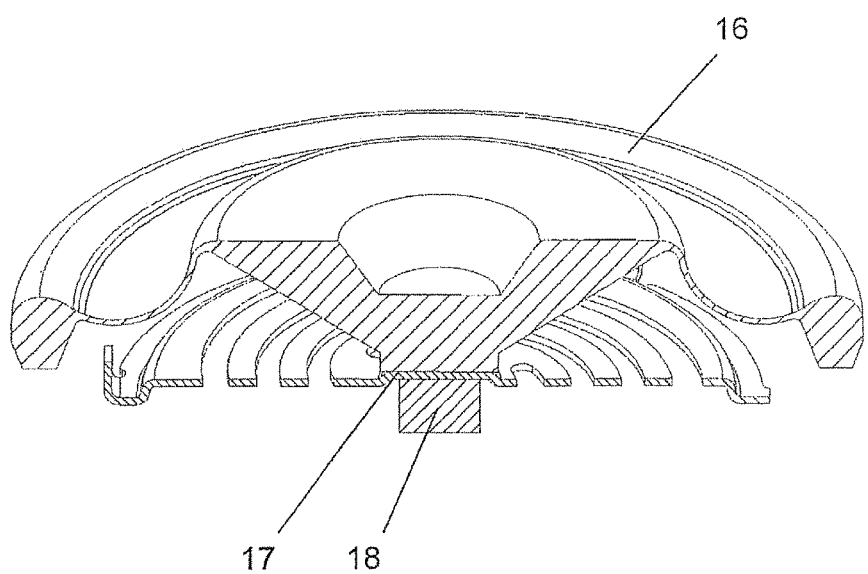
FIG. 8 shows a detail from FIG. 7 in a sectioned, perspective illustration.

According to FIG. 8, the resilient element 17 is configured in the manner of a disk-like leaf spring. The leaf spring 17 has a circular shape. Furthermore, the leaf spring 17 has a spring element extending spirally from the center to the edge region of the leaf spring 17. The leaf spring 17 is produced from metal as a punched part. The signal transmitter 18 is arranged on the resilient element 17, specifically in the center of the same. Here, the signal transmitter 18 is adhesively bonded to the resilient element 17. The diaphragm 16 and the resilient element 17, and also the signal transmitter 18 and the signal receiver 19, are arranged in the interior of the housing 13 for the purpose of protection against external effects. As already mentioned, the connecting piece 14 is used for supplying the fluid 2 or the fluid pressure to the diaphragm 16.

The invention is not restricted to the exemplary embodiment described and illustrated. Instead, it also comprises all technical developments within the scope of the invention defined by the patent claims. Thus, a measuring device, such as level sensor 6, of this type can be used not only on a container 1 for a solar water heater to measure the water level in the container 1, but also for level measurement in other applications.

LIST OF DESIGNATIONS

1: Container
2: Fluid/water
3: Conduit
4: Solenoid valve
5: Water supply system
6: Measuring device/level sensor
7: Dynamic pressure probe/pipe
8: Pressure sensor
9: Opening (in dynamic pressure probe)/pressure removal hole
10: Flow direction (during emptying)
11: Flow direction (during filling)
12: Voltage value
13: Housing (of pressure sensor)
14: Connecting piece
15: Electric connection
16: Diaphragm
17: Resilient element/leaf spring
18: Signal transmitter/magnet
19: Signal receiver/position sensor
20: Circuit board
21: Pipes/heat exchange medium
22, 23: End (of the pipe)

The invention claimed is:

1. A measuring device for measuring a fluid level of a container for holding the fluid comprising: the container being provided with a conduit for at least one of a supply and a removal of the fluid, a dynamic pressure probe arranged in the conduit, and a pressure sensor for measuring the pressure in the dynamic pressure probe that is connected to the dynamic pressure probe, in such a way that the fluid level in the container is determined by using the measured pressure,
wherein the pressure sensor comprises a housing, a diaphragm that is arranged one of in and on the housing, a resilient element, which is a leaf spring comprising a circular shape and a spring element extending spirally from a center to an edge region of the leaf spring, with one outer surface of the center of the leaf spring in direct contact with a central portion of the diaphragm such that the resilient element resets the diaphragm, a signal transmitter that is operatively connected to another outer surface of the center of the leaf spring, which is opposite to the one outer surface of the center of the leaf spring, such that the central portion of the diaphragm and the signal transmitter are both directly adjacent to the center of the leaf spring interposed therebetween, and a signal receiver that interacts with the signal transmitter.

2. The measuring device according to claim 1, wherein the dynamic pressure probe is arranged in the conduit substantially at right angles to a longitudinal direction of the conduit, and at least one opening is located in the dynamic pressure probe, and is directed toward the container when the dynamic pressure probe is arranged in the conduit.

3. The measuring device according to claim 1, wherein the dynamic pressure probe comprises a pipe having one end of the pipe fixed to the conduit and the other end of the pipe penetrates the conduit, and the pressure sensor is arranged at the other end on an opening of the pipe.

4. The measuring device according to claim 1, wherein the signal transmitter comprises a magnet, and the signal receiver comprises a position sensor detecting the magnetic field generated by the magnet.

5. The measuring device according to claim 1, wherein the diaphragm, the resilient element, the signal transmitter and the signal receiver are arranged in an interior of the housing, and the housing has a connecting piece for supplying a fluid pressure to the diaphragm.

6. A device for heating water comprising: a container to hold the water, the container being provided with a conduit for at least one of the supply of cold water and the removal of warm water, and a measuring device for measuring the water level in the container according to claim 1 which is arranged one of in and on the conduit.

7. The measuring device according to claim 1, wherein the measuring device is a level sensor.

8. The measuring device according to claim 1, wherein the dynamic pressure probe is configured as a pitot tube.

9. The measuring device according to claim 2, wherein the at least one opening in the dynamic pressure probe is a drilled hole.

10. The measuring device according to claim 3, wherein the one end of the pipe is fixed in a fluid-tight manner to a wall of the conduit by one of welding, soldering, and adhesive bonding.

11. The measuring device according to claim 3, wherein the pressure sensor is arranged outside of the conduit on the opening of the pipe.

12. The measuring device according to claim 1, wherein the resilient element is produced from metal as a punched part.

13. The measuring device according to claim 4, wherein the signal receiver is a Hall sensor.

14. The measuring device according to claim 1, wherein the signal transmitter is adhesively bonded to the resilient element.

15. The measuring device according to claim 5, wherein the connecting piece is arranged in a fluid-tight manner on the other end of the dynamic pressure probe.

16. The device for heating water according to claim 6, wherein the container comprises pipes arranged in the form of loops that are connected to a solar collector, in such a way that the water is heated by means of solar energy.

17. The measuring device according to claim 1, wherein the signal receiver is arranged on a printed circuit board that is located in the housing such that the signal receiver is at a position that is opposite to the signal transmitter.

* * * * *